(12) United States Patent
Zhang

(10) Patent No.: US 12,412,953 B2
(45) Date of Patent: Sep. 9, 2025

(54) ELECTRONIC DEVICE AND BATTERY COVER

(71) Applicant: Beijing Honor Device Co., Ltd., Beijing (CN)

(72) Inventor: Cheng Zhang, Beijing (CN)

(73) Assignee: Beijing Honor Device Co., Ltd., Beijing (CN)

(*) Notice: Subject to any disclaimer, the term of this patent is extended or adjusted under 35 U.S.C. 154(b) by 133 days.

(21) Appl. No.: 18/026,735

(22) PCT Filed: Jan. 29, 2022

(86) PCT No.: PCT/CN2022/074969
§ 371 (c)(1),
(2) Date: Mar. 16, 2023

(87) PCT Pub. No.: WO2022/247341
PCT Pub. Date: Dec. 1, 2022

(65) Prior Publication Data
US 2023/0402700 A1  Dec. 14, 2023

(30) Foreign Application Priority Data

May 27, 2021 (CN) .......................... 202110586584.5

(51) Int. Cl.
*H01M 50/282* (2021.01)
*H01M 50/202* (2021.01)
(Continued)

(52) U.S. Cl.
CPC ....... *H01M 50/282* (2021.01); *H01M 50/202* (2021.01); *H01M 50/242* (2021.01);
(Continued)

(58) Field of Classification Search
CPC ............ H01M 50/282; H01M 50/202; H01M 50/242; H01M 50/247; H01M 50/276;
(Continued)

(56) References Cited

U.S. PATENT DOCUMENTS 8,492,022 B2* 7/2013 Kim ...................... H01M 50/14
429/186
10,149,044 B2 12/2018 Behles et al.
(Continued)

FOREIGN PATENT DOCUMENTS

CN         202634518 U  * 12/2012
CN         204761890 U    11/2015
(Continued)

OTHER PUBLICATIONS

Qin, Ren-xuan ( Patent No. CN 112533114 A), Sound Producing Device and Electronic Equipment, Huawei Technologies Co., Ltd, Mar. 19, 2021), (Year: 2021).*

*Primary Examiner* — Mahendra R Patel
(74) *Attorney, Agent, or Firm* — WOMBLE BOND DICKINSON (US) LLP

(57) ABSTRACT

This application provides an electronic device and a battery cover. The electronic device includes a middle frame, a screen, and a battery cover. The middle frame includes a middle plate and surrounding side plates on four sides. The middle plate is disposed between the side plates, and partitions the side plates into a first portion and a second portion. The middle plate includes a first plate surface and a second plate surface. The first plate surface and the first portion enclose a first accommodating cavity, and the second plate surface and the second portion enclose a second accommodating cavity. The screen covers the first accommodating cavity. The second accommodating cavity includes a sound production assembly, a battery and a camera assembly therein. The sound production assembly, the battery. The (Continued)

battery cover covers the second accommodating cavity and includes at least one damping layer.

14 Claims, 6 Drawing Sheets

(51) Int. Cl.
*H01M 50/242* (2021.01)
*H01M 50/247* (2021.01)
*H01M 50/276* (2021.01)
*H01M 50/278* (2021.01)
*H04M 1/02* (2006.01)

(52) U.S. Cl.
CPC ....... *H01M 50/247* (2021.01); *H01M 50/276* (2021.01); *H01M 50/278* (2021.01); *H04M 1/0262* (2013.01); *H01M 2220/30* (2013.01)

(58) Field of Classification Search
CPC ........... H01M 50/278; H01M 2220/30; H04M 1/0262; H04M 1/03; Y02E 60/10
USPC ..................................................... 455/550.1
See application file for complete search history.

(56) References Cited

U.S. PATENT DOCUMENTS

| | | | | |
|---|---|---|---|---|
| 10,486,297 | B2 * | 11/2019 | Runau | H01M 50/231 |
| 10,784,916 | B2 * | 9/2020 | Coverstone | H04M 1/185 |
| 10,877,519 | B2 | 12/2020 | Lin et al. | |
| 2016/0021444 | A1 * | 1/2016 | Behles | H04R 1/288 |
| | | | | 381/354 |
| 2018/0366794 | A1 * | 12/2018 | Kim | H01M 10/6551 |
| 2019/0258294 | A1 * | 8/2019 | Lin | H01M 50/242 |
| 2023/0141955 | A1 * | 5/2023 | Luo | H04R 1/028 |

FOREIGN PATENT DOCUMENTS

| | | | | | |
|---|---|---|---|---|---|
| CN | 105227699 | A | | 1/2016 | |
| CN | 107210399 | A | | 9/2017 | |
| CN | 110149434 | A | | 8/2019 | |
| CN | 209823799 | U | * | 12/2019 | |
| CN | 110676035 | A | | 1/2020 | |
| CN | 210225469 | U | * | 3/2020 | ........... G06F 1/1605 |
| CN | 112261186 | A | | 1/2021 | |
| CN | 112261187 | A | * | 1/2021 | ........... H04M 1/026 |
| CN | 112533114 | A | * | 3/2021 | ........... H04M 1/035 |
| CN | 113471592 | A | | 10/2021 | |
| DE | 102019117047 | A1 | | 12/2020 | |
| EP | 4068496 | A1 | * | 10/2022 | ........... H01M 50/147 |
| EP | 4084447 | B1 | * | 5/2025 | ........... H04M 1/0214 |

* cited by examiner

ELECTRONIC DEVICE AND BATTERY COVER

CROSS-REFERENCE TO RELATED APPLICATIONS

This application is a national stage of International Application No. PCT/CN2022/074969, filed on Jan. 29, 2022, which claims priority to Chinese Patent Application No. 202110586584.5, filed on May 27, 2021. The disclosures of both of the aforementioned applications are hereby incorporated by reference in their entireties.

TECHNICAL FIELD

This application relates to the technical field of electronic terminal devices, and in particular, to an electronic device and a battery cover.

BACKGROUND

With the development of science and technology, electronic devices such as mobile phones have been essential communication tools in people's daily life. In the field of sound range, to improve a sound effect of a sound production element in a limited space, electronic devices such as mobile phones often use an open rear cavity to configure various sound production elements. By uncovering a traditional closed rear cavity, air in an original rear cavity communicates with air inside a whole device, and an originally useless clearance space of the whole device is used to expand the rear cavity, thereby effectively improving the sound effect. However, when the closed rear cavity is opened to communicate with the whole device, a battery cover vibrates after being impacted by an airflow caused by air circulation. This seriously affects user experience and reduces a life span of the battery cover.

In order to improve a vibration problem of the battery cover, materials such as foam may be placed on a surface of the battery cover to alleviate vibration of the battery cover. However, a space between a battery and the battery cover is limited, thus having a high requirement on a thickness of the placed materials. The battery cover may also be directly connected to the battery to suppress vibration of the battery cover. Since the battery cover is directly connected to the battery, an expansion space of the battery disappears. In addition, this also makes it difficult to detach the battery cover, causing a hard maintenance of the late phase and reducing user experience.

SUMMARY

This application provides an electronic device and a battery cover, to resolve a problem that the battery cover vibrates after being impacted by an airflow caused by air circulation when a mobile phone uses an open rear cavity. To resolve this problem, the following technical solutions are provided in this application.

According to an aspect, this application provides an electronic device, including: a middle frame, a screen, and a battery cover;

the middle frame includes a middle plate and surrounding side plates on four sides; the middle plate is disposed between the side plates, and the middle plate partitions the side plates into a first portion and a second portion;
the middle plate includes a first plate surface and a second plate surface, the first plate surface and the first portion enclose a first accommodating cavity, and the second plate surface and the second portion enclose a second accommodating cavity;
the screen covers the first accommodating cavity and is fixed to the middle frame;
the second accommodating cavity includes a sound production assembly, a battery and a camera assembly therein, and the sound production assembly, the battery, and the camera assembly are all disposed on the second plate surface of the middle plate; and the battery cover covers the second accommodating cavity and is fixed to the middle frame; the battery cover is of a multi-layer composite structure, the multi-layer composite structure includes a damping layer, and a quantity of the damping layers is at least one.

When a traditional closed rear cavity is opened to communicate with a whole device, air in an original rear cavity communicates with air in the whole device, and a battery cover vibrates after being impacted by an airflow. Technical solutions provided by this application use a damping material to form a sandwich structure so that air vibration in a second accommodating cavity is converted into heat energy and then exhausted. Vibration is suppressed by means of a shearing effect of the damping material in a multi-layer structure, and there is no need to occupy additional internal space. In this way, vibration can be suppressed by means of self-energy absorption, and utilization of the damping material can also be ensured, thereby improving a vibration damping effect.

Optionally, the battery is disposed between the sound production assembly and the camera assembly, is separated from the sound production assembly by a first gap, and is separated from the camera assembly by a second gap.

Optionally, the multi-layer composite structure also includes a surface layer and a base layer; and the damping layer is disposed between the surface layer and the base layer, and the base layer is disposed on a side close to the second accommodating cavity.

Optionally, the damping layer includes a first damping layer and a second damping layer; and
a connecting layer is disposed between the first damping layer and the second damping layer.

Optionally, a thickness of the damping layer is 5%-50% of a thickness of the multi-layer composite structure.

Optionally, the surface layer is of a glass material.

Optionally, the damping layer is made of a damping material, and the damping material includes one or more of a rubber damping material, an alloy damping material, and a metal high damping material.

Optionally, the battery cover includes at least one first region, and an area of the first region is smaller than an area of the battery cover, and at least one damping layer is disposed in the first region.

According to another aspect, this application provides a battery cover applied to an electronic device, where the battery cover is of a multi-layer composite structure, and the multi-layer composite structure includes a surface layer, a damping layer, and a base layer; and
the damping layer is disposed between the surface layer and the base layer, and a quantity of the damping layers is at least one.

Optionally, the damping layer includes a first damping layer and a second damping layer; and
a connecting layer is disposed between the first damping layer and the second damping layer.

Optionally, a thickness of the damping layer is 5%-50% of a thickness of the multi-layer composite structure.

Optionally, the surface layer is of a glass material.

Optionally, the damping layer is made of a damping material, and the damping material includes one or more of a rubber damping material, an alloy damping material, and a metal high damping material.

Optionally, the battery cover includes at least one first region, and an area of the first region is smaller than an area of the battery cover, and at least one damping layer is disposed in the first region.

From the foregoing technical solutions, it can be learned that this application provides an electronic device and a battery cover. The battery cover is applied to the electronic device. The electronic device includes a middle frame, a screen and a battery cover. The middle frame includes a middle plate and surrounding side plates on four sides. The middle plate is disposed between the side plates, and the middle plate partitions the side plates into a first portion and a second portion. The middle plate includes a first plate surface and a second plate surface. The first plate surface and the first portion enclose a first accommodating cavity, and the second plate surface and the second portion enclose a second accommodating cavity. The screen covers the first accommodating cavity and is fixed to the middle frame. The second accommodating cavity includes a sound production assembly, a battery and a camera assembly therein. The sound production assembly, the battery, and the camera assembly are all disposed on the second plate surface.

The battery cover covers the second accommodating cavity and is fixed to the middle frame; and the battery cover is of a multi-layer composite structure, the multi-layer composite structure includes a damping layer, and a quantity of the damping layers is at least one. In this way, an objective of eliminating vibration of the battery cover is achieved, thereby improving user experience.

DESCRIPTION OF EMBODIMENTS

Figure 1:
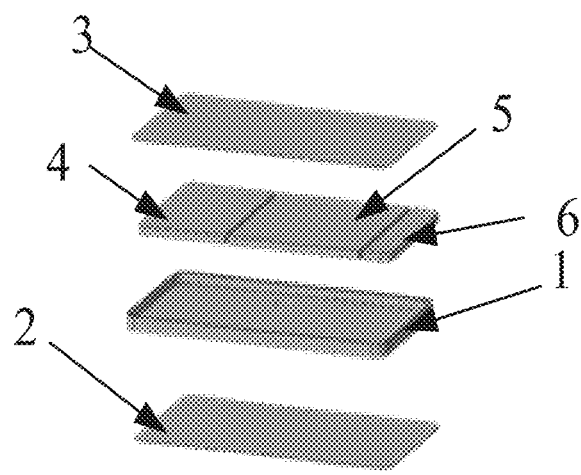
FIG. 1 is a schematic exploded view of a structure of an electronic device according to an embodiment of this application.

Embodiments are described in detail below, and examples are shown in the accompanying drawings. When the following descriptions are made with reference to the accompanying drawings, unless otherwise indicated, the same numbers in different accompanying drawings represent the same or similar elements. The following implementations described in the following embodiments do not represent all implementations that are consistent with this application. These implementations are merely examples of systems and methods consistent with some aspects of this application as recited in the claims.

For an electronic device that directly adheres a foam or polymer material to a battery cover to alleviate vibration, when the foam material is used, although it may have a certain vibration damping effect, a space between the battery cover and a battery has a certain limitation. This puts a great restriction on a thickness of the foam in a small space in that when the foam is vibrated, the foam bends and deforms due to an external force.

Similarly, when the polymer material is used, the polymer material includes a damping material characterized by bending deformation. However, the damping material fails to produce a shear strain and a shear stress internally, and damping performance of the damping material fails to be fully exerted. As a result, property utilization of the damping material is reduced, and the vibration damping effect is also reduced.

Further, in the existing technology, for an electronic device directly adheres a battery cover to a battery to alleviate vibration, an implementation of such an electronic device is very direct in that a vibrating battery cover is directly fixed on a non-vibrating battery to restrain the battery cover by using the battery, thereby suppressing the vibration of the battery cover. Although this solution can directly and effectively suppress the vibration of the battery cover, it reduces an expansion space of the battery or even completely eliminates the expansion space of the battery. If there is no expansion space for the battery at all, it will be necessary to leave an expansion space for the battery in a middle frame or other regions. This occupies more additional space in the electronic device, limiting a design of a whole electronic device. In addition, this solution also makes it difficult to detach the battery cover, causing inconvenience for users in a late phase to implement maintenance.

However, the battery cover in this application uses a damping material to form a sandwich structure so that air vibration in a second accommodating cavity is converted into heat energy and then exhausted. Vibration is suppressed by means of a shearing effect of the damping material in a multi-layer structure instead of utilizing performance of the damping material in its bending deformation. This method does not need to occupy additional internal space. In this way, vibration can be suppressed by means of self-energy absorption, and utilization of the damping material can also be ensured, thereby improving the vibration damping effect.

This application provides an electronic device. FIG. 1 is a schematic exploded view of a structure of an electronic device according to an embodiment of this application. For details, reference may be made to FIG. 1. The electronic device includes a middle frame 1, a screen 2, a battery cover 3, a sound production assembly 4, a battery 5 and a camera assembly 6 therein. The middle frame 1 accommodates the sound production assembly 4, the battery 5, and the camera assembly 6. The screen 2 is fixed to the middle frame 1.

Figure 2:
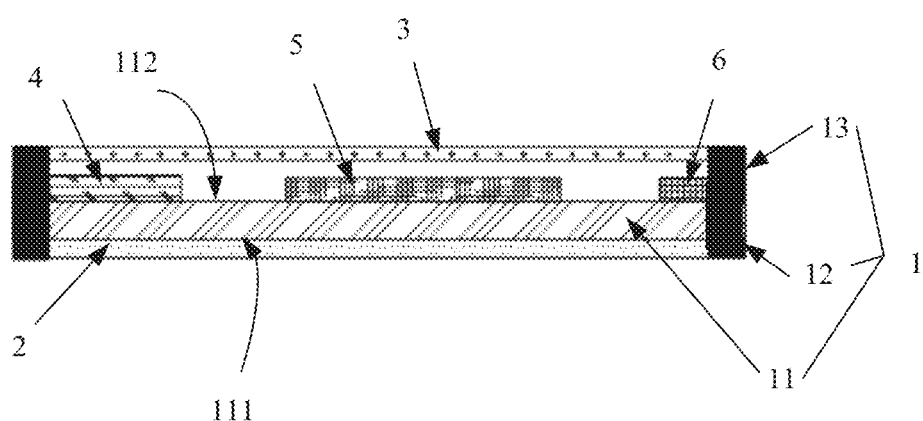
FIG. 2 is a cross schematic diagram of an electronic device according to an embodiment of this application.

FIG. 2 is a cross schematic diagram of an electronic device according to an embodiment of this application. For details, reference may be made to FIG. 2. The middle frame 1 includes a middle plate 11 and surrounding side plates on four sides. The middle plate 11 is disposed between the side plates, and the middle plate 11 partitions the side plates into a first portion 12 and a second portion 13. The middle plate 11 includes a first plate surface 111 and a second plate surface 112. The first plate surface 111 and the first portion 12 enclose a first accommodating cavity, and the second plate surface 112 and the second portion 13 enclose a second accommodating cavity. The screen 2 covers the first accommodating cavity and is fixed to the middle frame 1.

Further, the second accommodating cavity includes a sound production assembly 4, a battery 5 and a camera assembly 6 therein. The sound production assembly 4, the battery 5, and the camera assembly 6 are all disposed on the second plate surface 112 of the middle plate 11. The battery 5 is disposed between the sound production assembly 4 and the camera assembly 6, is separated from the sound production assembly 4 by a first gap, and is separated from the camera assembly 7 by a second gap. The battery 5 is configured to accommodate the battery and other battery components. The battery cover 3 covers the second accommodating cavity, and is fixed to the middle frame 1.

When receiving an audio signal, the sound production assembly 4 produces self-vibration and drives air in the second accommodating cavity to vibrate. When an airflow vibrates, to be specific, the battery cover 3 vibrates due to vibration caused by the airflow.

Figure 3:
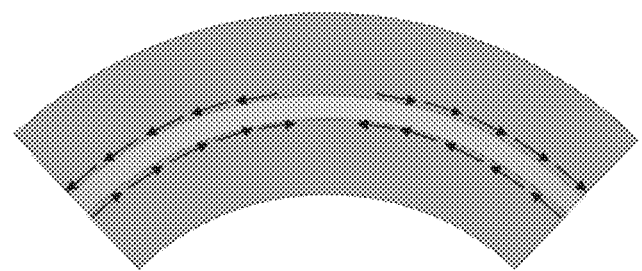
FIG. 3 is a schematic structural diagram of a battery cover deformed by vibration according to an embodiment of this application.

Further, in this embodiment of this application, the battery cover 3 of the electronic device is of a multi-layer composite structure. The multi-layer composite structure includes at least one damping layer 32, and the damping layer 32 includes a damping material. FIG. 3 is a schematic structural diagram of a battery cover deformed by vibration according to an embodiment of this application. Referring to FIG. 3, it can be clearly learned that the damping layer 32 bears a shear force when the battery cover 3 deforms by vibration, and directions of shear forces on the top and the bottom of the damping layer 32 are opposite to each other. Preparation of the battery cover 3 is made from the perspective of energy consumption, to utilize a damping property of the damping material in converting energy to convert kinetic energy of the battery cover vibration caused by an airflow due to air circulation into heat energy of the damping material, which alleviates vibration of the battery cover through self-energy absorption of the damping material. Viscoelasticity of a high molecular polymer (mainly a rubber and plastic material) in the damping material is particularly prominent, and the high molecular polymer has a relatively large damping factor. When the damping material is deformed by an alternating stress, part of its energy is stored, and the other part of the energy is dissipated and converted into heat energy due to the viscoelasticity of the material itself. This energy loss is manifested as mechanical damping, thereby achieving the vibration damping effect.

Further, the multi-layer composite structure includes a surface layer 31 and a base layer 33. The at least one damping layer 32 is disposed between the surface layer 31 and the base layer 33, and the base layer 33 is disposed toward the second accommodating cavity.

Further, the damping layer 32 includes a first damping layer and a second damping layer. A connecting layer is disposed between the first damping layer and the second damping layer. The connecting layer is configured to connect the first damping layer and the second damping layer.

IMPLEMENTATION

Figure 4:
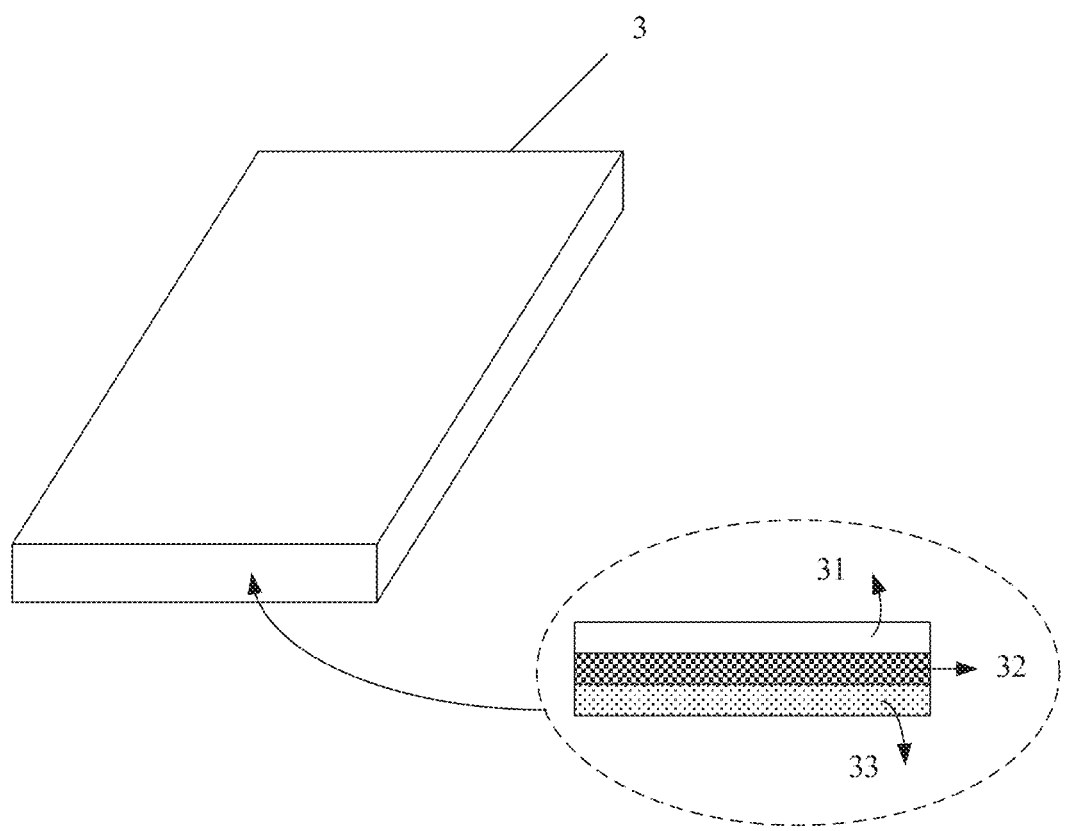
FIG. 4 is a schematic structural diagram of a battery cover according to an embodiment of this application.

FIG. 4 is a schematic structural diagram of a battery cover according to an embodiment of this application. Referring to FIG. 4, the battery cover 3 in this embodiment is of an integral sandwich structure, and a quantity of layers of the integral sandwich structure is three, including a base layer 33, a damping layer 32, and a surface layer 31. The base layer 33 is located on a side close to the second accommodating cavity in the battery cover 3. The base layer 33 is connected to the surface layer 31 through the damping layer 32. The base layer 33 is adhered to the surface layer 31 through the damping layer 32. The surface layer 31 is made of a glass material, and the base layer 33 is made of a glass material or a metal material. The material of the base layer 33 is optional as it may be a glass material, a metal material, a ceramic material, and the like.

The damping layer 32 is made of a viscoelastic material, covered with the surface layer 31 made of the same or different material as the base layer 33 as an outer layer. When subjected to bending vibration, tension-compression deformation of the surface layer 31 and the base layer 33 is smaller than that of the damping layer to hinder the tension and compression of the damping layer 32, so that a shear strain and a shear stress are generated inside the damping material, and this shear effect of the viscoelastic damping layer is used to dissipate vibration energy. Further, there is no specific requirement for setting a thickness of each layer in the battery cover 3, and each layer may have a same thickness or may have an inconsistent thickness under a premise of ensuring a reliability of a whole device. It should be noted that although the thickness of each layer is not limited in this application as the thickness may be designed according to thickness requirements of the whole device, a total thickness of the damping layer 32 needs to account for 5%-50% of a total thickness of the battery cover 3.

Figure 5:
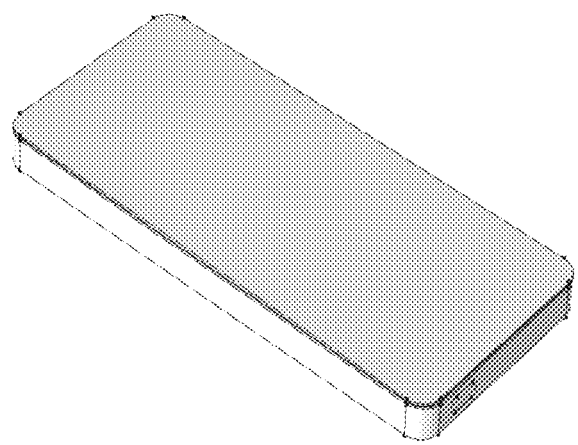
FIG. 5 is a schematic diagram of a verification model of an electronic device according to an embodiment of this application.

Further, a simulation tool is used to perform validity verification on the battery cover 3 provided in this application. FIG. 5 is a schematic diagram of a verification model of an electronic device according to an embodiment of this application. Referring to FIG. 5, under a same condition of air impact in the second accommodating cavity, two verifications are implemented respectively to two groups. The two groups respectively use a single-layer pure glass structure of a battery cover (including model not including a damping layer) and a sandwich structure (a model including a damping layer) with a damping material. In this case, the single-layer pure glass structure model and the sandwich structure model with the damping material are consistent in vibration form, and a vibration frequency is set at 1600 Hz-2000 Hz on average.

Figure 6:
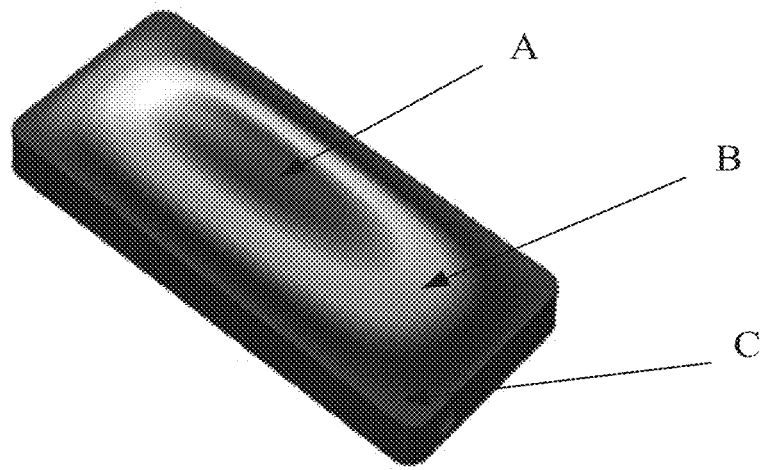
FIG. 6 is a schematic diagram of a region of a vibration intensity of a verification model according to an embodiment of this application.

FIG. 6 is a schematic diagram of a region of a vibration intensity of a verification model according to an embodiment of this application. Referring to FIG. 6, after the verification model is impacted by air in the second accommodating cavity, the verification model shows different vibration intensities in different regions. It can be seen from FIG. 6 that a region A is a region with a higher vibration intensity. The vibration intensity is gradually reduced from the inside of the region A to an end of the battery cover, and the vibration intensity is sequentially reduced from the region A to a region C.

Figure 7:
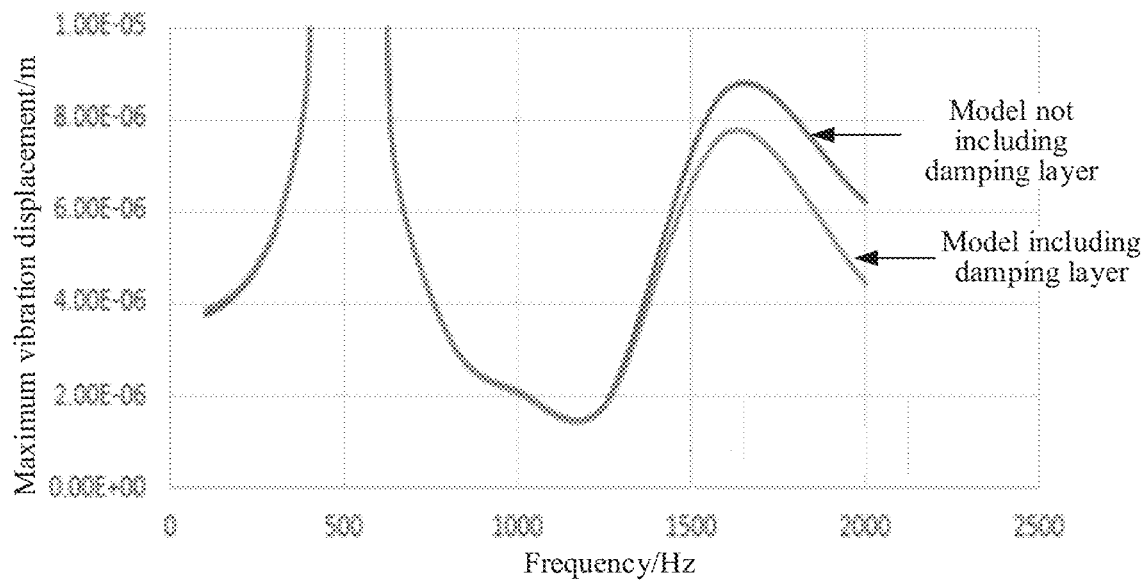
FIG. 7 is a graph of a testing analysis result of a verification model according to an embodiment of this application.

FIG. 7 is a graph of a testing analysis result of a verification model according to an embodiment of this application. Referring to FIG. 7, a maximum vibration displacement of two groups of simulation models is tested; the maximum vibration displacement of a model including a damping layer at 1600 Hz-2000 Hz is significantly less than that of a model not including a damping layer, and the maximum vibration displacement of the model including a damping layer is more than 25% less than that of the model not including a damping layer. Therefore, it indicates that the battery cover 3 provided in this application effectively suppresses vibration by utilizing a damping property of the damping material and has a significant effect compared with a traditional single-layer pure glass structure. It should be noted that this application only takes a vibration frequency in a range of 1600 Hz-2000 Hz as an example and implements verification. According to the damping property of the damping material, a damping in the damping material with a high damping factor varies with a frequency. Similarly, a range of vibration frequency may be set according to an actual situation, to change the damping material in a sandwich structure. Different damping materials may be used to target the battery cover in a specific vibration frequency range to achieve the vibration damping effect.

Optionally, another implementation is based on the foregoing battery cover 3 which is of an integral sandwich structure. The battery cover 3 provided in this embodiment is of the integral sandwich structure. The integral sandwich structure includes a multi-layer sandwich structure, and a quantity of layers of the sandwich structure is not limited to three and there are a plurality of layers. Taking the battery cover 3 being of a five-layer sandwich structure as an example, the damping layer 32 includes a first damping layer t2 and a second damping layer t4; and a connecting layer t3 is disposed between the first damping layer t2 and the second damping layer t4. The connecting layer t3 is configured to connect the first damping layer t2 and the second damping layer t4.

Figure 8:
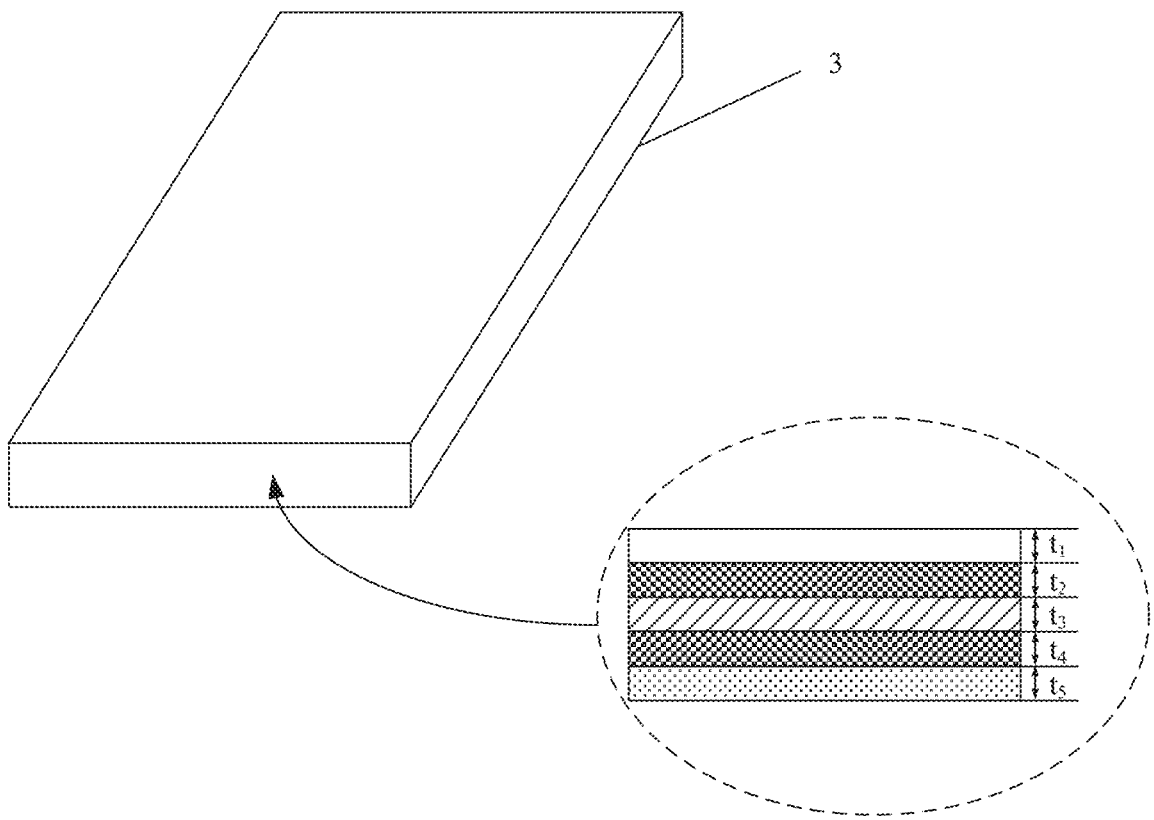
FIG. 8 is a schematic diagram of a whole battery cover including a multi-layer sandwich structure according to an embodiment of this application.

FIG. 8 is a schematic diagram of a whole battery cover including a multi-layer sandwich structure according to an embodiment of this application. For details, reference may be made to FIG. 8. The battery cover 3 includes a base layer 33, a damping layer 32, a connecting layer, and a surface layer 31. The connecting layer is disposed between each layer of the damping layer 32 and is configured to isolate each layer of the damping layer 32. The material used in the connecting layer may be the same as or different from that of the base layer. A preferred implementation is based on the connecting layer, the damping layer 32, surface layer 31, and the base layer 33 are distributed symmetrically. In addition, t1 is a surface layer, t2 and t4 are damping layers, t3 is a connecting layer, t5 is a base layer, t1=t5, and t2=t4.

Optionally, another implementation is based on the foregoing battery cover 3 which is of a sandwich structure. The battery cover 3 provided in this application is a sandwich structure, and the sandwich structure is not limited to a sandwich structure of a whole battery cover 3. The sandwich structure may be a local sandwich or a multi-local sandwich structure.

Figure 9:
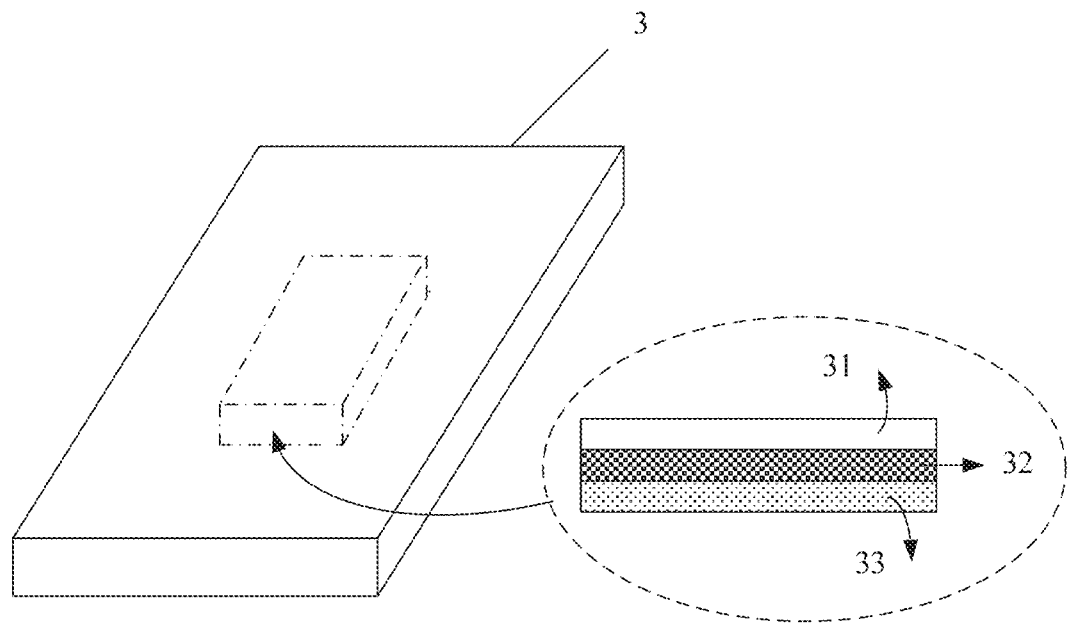
FIG. 9 is a schematic diagram of a local battery cover including a sandwich structure according to an embodiment of this application.
Figure 10:
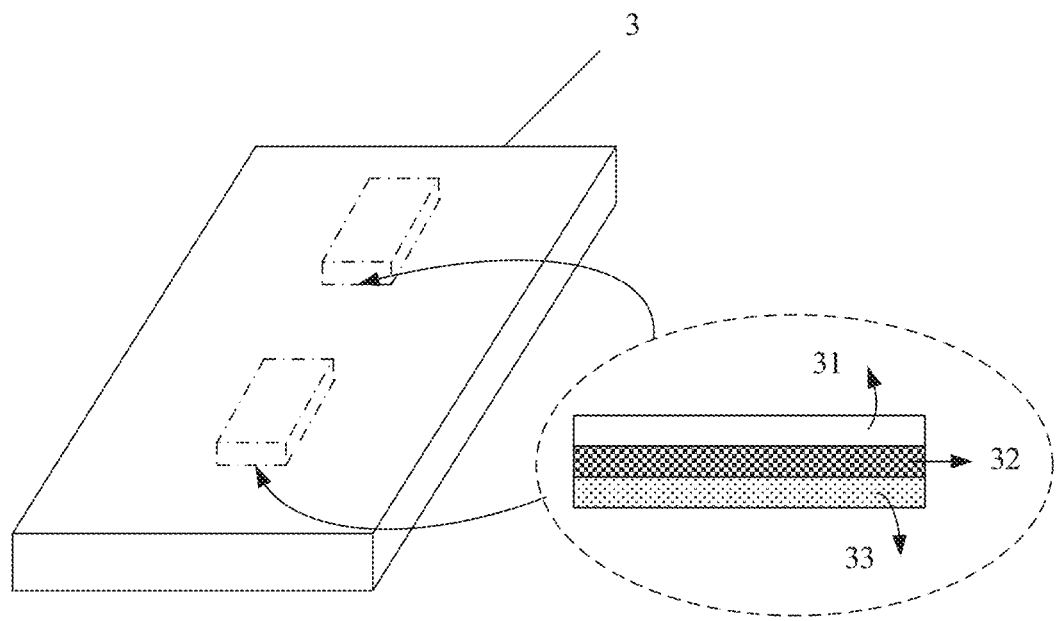
FIG. 10 is a schematic diagram of a multi-local battery cover including a sandwich structure according to an embodiment of this application.

FIG. 9 is a schematic diagram of a local battery cover 3 including a sandwich structure according to an embodiment of this application. FIG. 10 is a schematic diagram of a multi-local battery cover including a sandwich structure according to an embodiment of this application. Referring to FIG. 9, the battery cover 3 may be of a local sandwich structure. Referring to FIG. 10, the battery cover 3 is of a multi-local sandwich structure.

Based on the above, it can be learned that in a simulation model provided in this application, a region A is a region with a higher vibration intensity. The vibration intensity is gradually reduced from the inside of the region A to an end of the battery cover. Therefore, in the embodiments of this application, a local sandwich structure or a multi-local sandwich structure is only used for the region A with a higher vibration intensity. In an implementation performed by a person skilled in the art, according to a property of vibration performance of a whole device, a local region or a multi-local region may be used to implement a design for different vibration intensities. In addition, other regions may be designed with a same material as a surface layer.

Optionally, another implementation is based on the foregoing battery cover 3 which is of an integral sandwich structure. The battery cover 3 provided in this embodiment of this application is of the integral sandwich structure, a material such as foam 34 is also disposed on an end surface of the battery cover, and the foam 34 is disposed on the base layer 33 in the battery cover and is close to a side of the second accommodating cavity.

Figure 11:
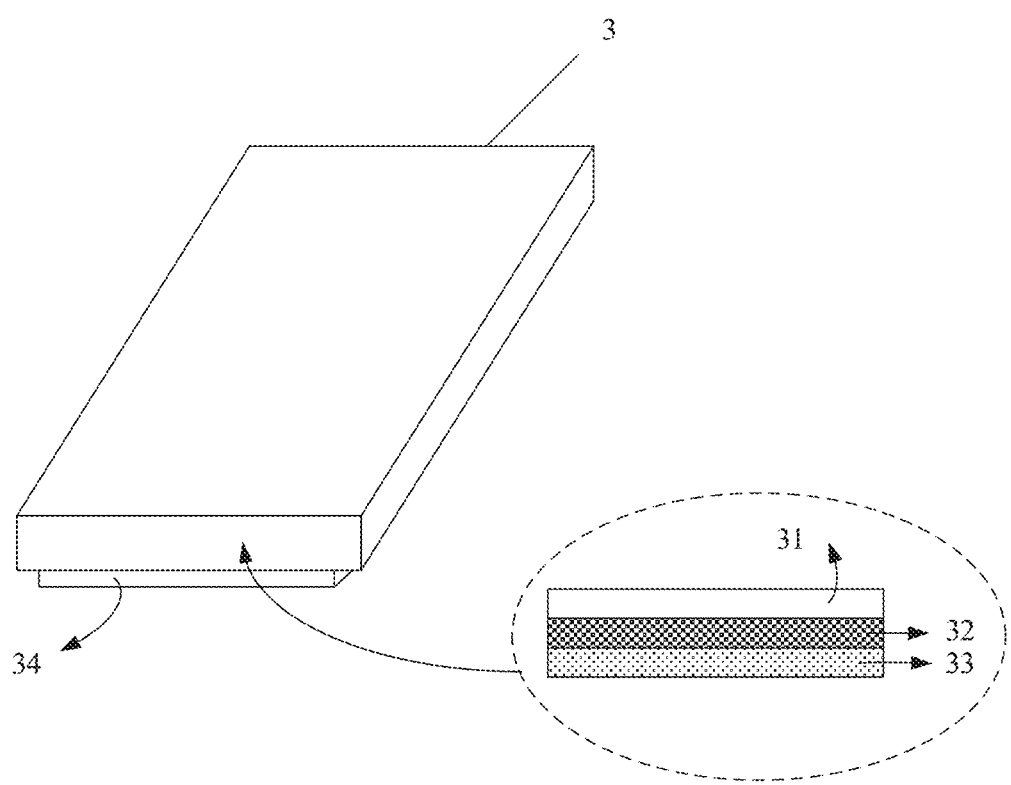
FIG. 11 is a schematic structural diagram of a combination of a battery cover and foam according to an embodiment of this application.

FIG. 11 is a schematic structural diagram of a combination of a battery cover and foam according to an embodiment of this application. For details, reference may be made to FIG. 11. The foam 34 is combined with the battery cover 3. Under a premise of satisfying a space between a battery 5 and a battery cover 3, a reasonable thickness of the foam 34 is designed, and the foam 34 is disposed on the base layer 33. This does not affect a whole structure. In addition, the foam 34 and other materials may utilize self-absorption to absorb and then convert vibration energy into heat, which is eventually exhausted. Moreover, a damping layer 32 in a sandwich structure of the battery cover 3 uses a viscous damping material. This may also absorb, through utilizing shearing effects of the damping material, vibration energy by the damping material itself and convert vibration energy into heat energy and then dissipated, and a better vibration damping effect is achieved.

Optionally, another implementation is based on the foregoing battery cover 3 which is of a local or multi-local sandwich structure. The battery cover 3 provided in this application is of a local sandwich structure or a multi-local sandwich structure. Similarly, a material such as foam 34 is also disposed on an end surface of the battery cover, and the foam 34 is disposed on a side of a second accommodating cavity close to the base layer 33. According to a local or a multi-local region design, multiple pieces of foam 34 are disposed on a local or a multi-local region. Under a premise of satisfying the space between a battery 5 and the battery cover 3, a fair thickness of the foam 34 is designed. This does not affect a whole structure, and in addition, a region with a large vibration amplitude or a region that has a requirement on vibration damping is targeted to be set, thereby achieving a better vibration damping effect.

Further, the damping layer 32 provided in this application uses a damping material. The damping material is optional, including but not limited to a rubber, for example, a polymer damping material such as a nitrile butadiene rubber, a polysulfide rubber, a butyl rubber, a polyurethane elastomer, polyester, and a polyvinyl butyral. The damping material also includes an alloy and metal high damping material. The damping material may be selected according to an actual situation.

Further, a damping material in the damping layer 32 may improve utilization of a material by using a shearing effect itself, maintain good performance of vibration damping, and achieve an objective of suppressing noise. In addition, by setting the damping material, a good design of an ID may be performed based on a physicochemical property of the damping material itself. For example, the design may include an overall color design and a partial color design. A pattern layer may also be disposed between a surface layer 31 and a damping layer 32. Specifically, the pattern layer is disposed on an inner surface of the damping layer 32. In this way, the battery cover 3 may be more beautiful, and an appearance design of the battery cover 3 is completed, thereby improving the user experience.

Further, the damping layer 32 may be adhered to the surface layer 31 and the base layer 33 by using viscoelasticity of the damping material itself, or may be adhered in another adhesive manner such as an optical adhesive or a back adhesive.

The electronic device in the embodiments of this application includes but is not limited to: a notebook computer, a tablet computer, a mobile phone, a network set-top box, and the like. When any component of any electronic device is not suitable for installation in a conventional fixing or protection manner due to various reasons, the technical solutions provided in the embodiments of this application may be used.

A person skilled in the art can easily figure out another implementation of this application after considering the specification and practicing this application that is disclosed herein. This application is intended to cover any variations, uses or adaptive changes of this application. Such variations, uses or adaptive changes follow the general principles of this application, and include well-known knowledge and conventional technical means in the art that are not disclosed in this application. The specification and the embodiments are considered as merely exemplary, and the scope and spirit of this application are pointed out in the following claims.

It should be understood that this application is not limited to the precise structures described above and shown in the accompanying drawings, and various modifications and changes can be made without departing from the scope of this application. The scope of this application is subject only to the appended claims.

What is claimed is:

1. An electronic device, comprising:
   a middle frame comprising a middle plate and surrounding side plates on four sides; the middle plate is disposed between the side plates, and the middle plate partitions the side plates into a first portion and a second portion, wherein the middle plate comprises a first plate surface and a second plate surface, the first plate surface and the first portion enclose a first accommodating cavity, and the second plate surface and the second portion enclose a second accommodating cavity;
   a screen that covers the first accommodating cavity and is fixed to the middle frame, wherein the second accommodating cavity comprises a sound production assembly, a battery and a camera assembly therein, and the sound production assembly, the battery, and the camera assembly are all disposed on the second plate surface of the middle plate; and
   a battery cover that covers the second accommodating cavity and is fixed to the middle frame; and the battery cover is of a multi-layer composite structure, the multi-layer composite structure comprises at least one damping layer, wherein the battery is disposed between the sound production assembly and the camera assembly, is separated from the sound production assembly by a first gap, and is separated from the camera assembly by a second gap.

2. The electronic device according to claim 1, wherein the at least one damping layer is configured to dampen a vibration associated with the electronic device.

3. The electronic device according to claim 1, wherein the multi-layer composite structure further comprises a surface layer and a base layer; and the at least one damping layer is disposed between the surface layer and the base layer, and the base layer is disposed on a side close to the second accommodating cavity.

4. The electronic device according to claim 3, wherein the at least one damping layer comprises a first damping layer and a second damping layer; and
   a connecting layer is disposed between the first damping layer and the second damping layer.

5. The electronic device according to claim 1, wherein a thickness of the at least one damping layer is 5%-50% of a thickness of the multi-layer composite structure.

6. The electronic device according to claim 3, wherein the surface layer is of a glass material.

7. The electronic device according to claim 1, wherein the at least one damping layer is made of a damping material, and the damping material comprises one or more of a rubber damping material, an alloy damping material, and a metal high damping material.

8. The electronic device according to claim 1, wherein the battery cover comprises at least one first region, and an area of the first region is smaller than an area of the battery cover, and the at least one damping layer is disposed in the first region.

9. A battery cover, applied to an electronic device, wherein the electronic device comprises:
   a middle frame comprising a middle plate and surrounding side plates on four sides,
   the middle plate is disposed between the side plates, and the middle plate partitions the side plates into a first portion and a second portion, wherein the middle plate comprises a first plate surface and a second plate surface, the first plate surface and the first portion enclose a first accommodating cavity, and the second plate surface and the second portion enclose a second accommodating cavity; and
   a screen that covers the first accommodating cavity and is fixed to the middle frame, wherein the second accommodating cavity comprises a sound production assembly, a battery and a camera assembly therein, and the sound production assembly, the battery, and the camera assembly are all disposed on the second plate surface of the middle plate; and
   wherein the battery cover is configured to cover the second accommodating cavity and is fixed to the middle frame, and the battery cover comprises a multi-layer composite structure that comprises at least one damping layer, wherein the battery is disposed between the sound production assembly and the camera assembly, is separated from the sound production assembly by a first gap, and is separated from the camera assembly by a second gap.

10. The battery cover according to claim 9, wherein the at least one damping layer comprises a first damping layer and a second damping layer; and
    a connecting layer is disposed between the first damping layer and the second damping layer.

11. The battery cover according to claim 9, wherein a thickness of the at least one damping layer is 5%-50% of a thickness of the multi-layer composite structure.

12. The battery cover according to claim 9, wherein the surface layer is of a glass material.

13. The battery cover according to claim 9, wherein the at least one damping layer is made of a damping material, and the damping material comprises one or more of a rubber damping material, an alloy damping material, and a metal high damping material.

14. The battery cover according to claim 9, wherein the battery cover comprises at least one first region, an area of the first region is smaller than an area of the battery cover, and the at least one damping layer is disposed in the first region.

* * * * *